United States Patent
Melfi

(10) Patent No.: US 11,911,726 B2
(45) Date of Patent: Feb. 27, 2024

(54) TOILET DEHUMIDIFIER ASSEMBLY

(71) Applicant: Michael Melfi, Macedon, NY (US)

(72) Inventor: Michael Melfi, Macedon, NY (US)

( * ) Notice: Subject to any disclaimer, the term of this patent is extended or adjusted under 35 U.S.C. 154(b) by 301 days.

(21) Appl. No.: 17/474,573

(22) Filed: Sep. 14, 2021

(65) Prior Publication Data
US 2022/0080350 A1 Mar. 17, 2022

Related U.S. Application Data

(60) Provisional application No. 63/206,101, filed on Jan. 29, 2021, provisional application No. 63/204,188, filed on Sep. 17, 2020.

(51) Int. Cl.
*B01D 53/26* (2006.01)
*E03D 1/26* (2006.01)
*E03D 9/04* (2006.01)

(52) U.S. Cl.
CPC .............. *B01D 53/26* (2013.01); *E03D 1/26* (2013.01); *E03D 9/04* (2013.01)

(58) Field of Classification Search
CPC .............. B01D 53/26; E03D 1/26; E03D 9/04
See application file for complete search history.

(56) References Cited

U.S. PATENT DOCUMENTS

| 4,927,436 | A  | * | 5/1990 | Glienke | ............... | B01D 53/261 |
| | | | | | | 96/119 |
| 7,996,928 | B2 | * | 8/2011 | Lorenz | ...................... | E03B 3/28 |
| | | | | | | 62/3.4 |
| 2009/0119827 | A1 | * | 5/2009 | Sokolowski | .............. | F24F 3/14 |
| | | | | | | 62/271 |

* cited by examiner

*Primary Examiner* — Sharon Pregler

(57) ABSTRACT

A toilet dehumidifier assembly for draining reclaimed water into a toilet tank includes a toilet tank lid that has an opening extending through the toilet lid. The toilet tank lid is positionable on a toilet tank. A dehumidifier is attachable to the toilet tank lid to remove moisture from ambient air surrounding the toilet tank. The dehumidifier is aligned with the opening in the toilet tank lid to drain water into the toilet tank. A container is positionable inside the toilet tank to capture the water drained from the dehumidifier.

5 Claims, 5 Drawing Sheets

TOILET DEHUMIDIFIER ASSEMBLY

CROSS-REFERENCE TO RELATED APPLICATIONS

I hereby claim the benefit under 35 U.S.C. Section 119(e) of U.S. Provisional application 63/204,188 filed Sep. 17, 2020 and Provisional application 63/206,101 filed Jan. 29, 2021

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dehumidifier devices and more particularly pertains to a new dehumidifier device for draining reclaimed water into a toilet tank for flushing. The device includes a toilet tank lid and a dehumidifier that is attached to the toilet tank lid. The device includes a container that is mountable in the toilet tank to capture the reclaimed water for watering plants, for example.

(2) Description of Related Art Including Information Disclosed Under 37 CFR 1.97 and 1.98

The prior art relates to dehumidifier devices including a dehumidifier device that is in integrated into a toilet tank thereby facilitating a toilet to be flushed with reclaimed water. The prior art discloses a dehumidifier that is mounted on a toilet tank lid and which includes a drain tube that penetrates a toilet tank to drain reclaimed water into the toilet tank.

BRIEF SUMMARY OF THE INVENTION

An embodiment of the disclosure meets the needs presented above by generally comprising a toilet tank lid that has an opening extending through the toilet lid. The toilet tank lid is positionable on a toilet tank. A dehumidifier is attachable to the toilet tank lid to remove moisture from ambient air surrounding the toilet tank. The dehumidifier is aligned with the opening in the toilet tank lid to drain water into the toilet tank. A container is positionable inside the toilet tank to capture the water drained from the dehumidifier.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
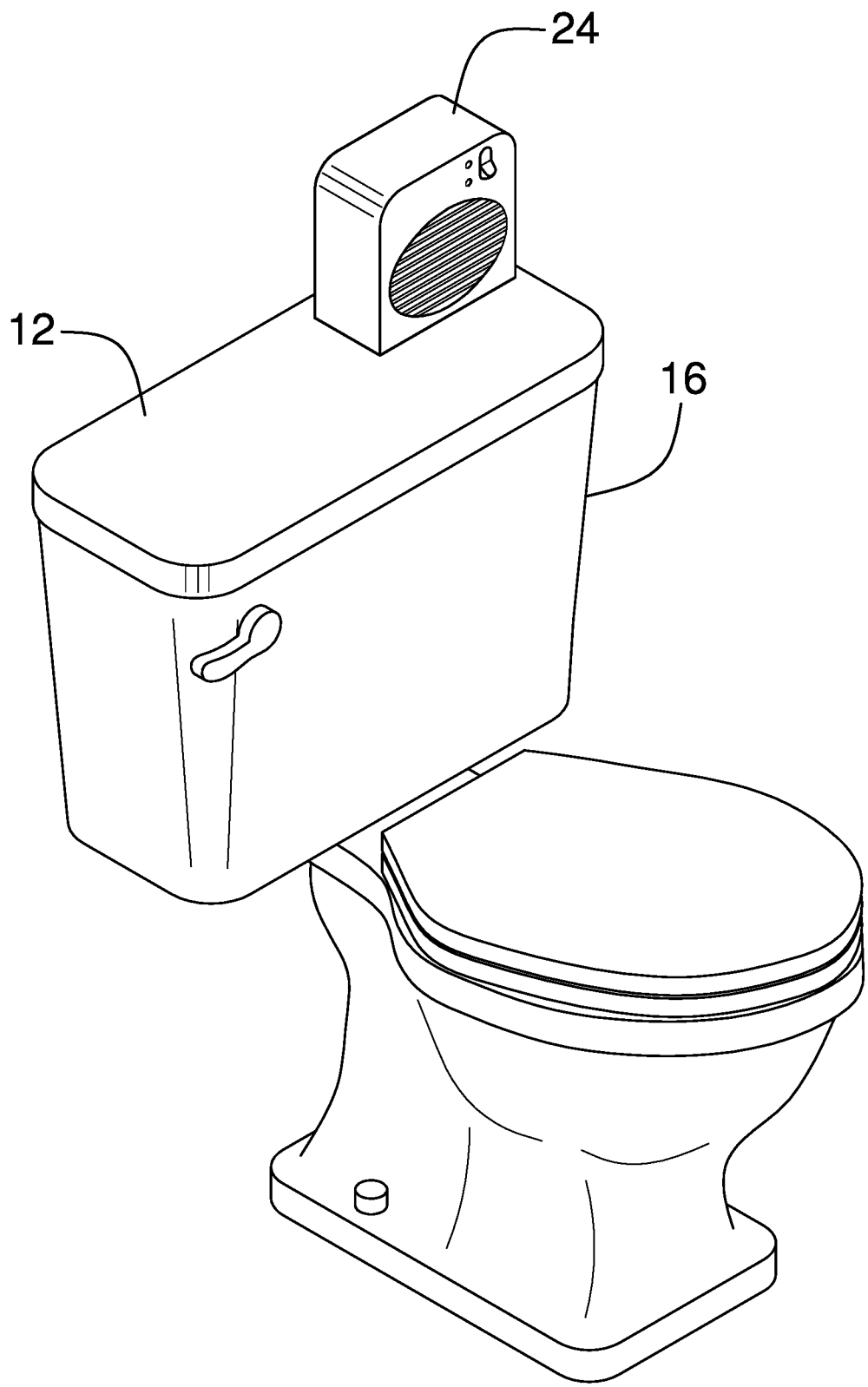
FIG. 1 is a front perspective view of a toilet dehumidifier assembly according to an embodiment of the disclosure.
Figure 2:
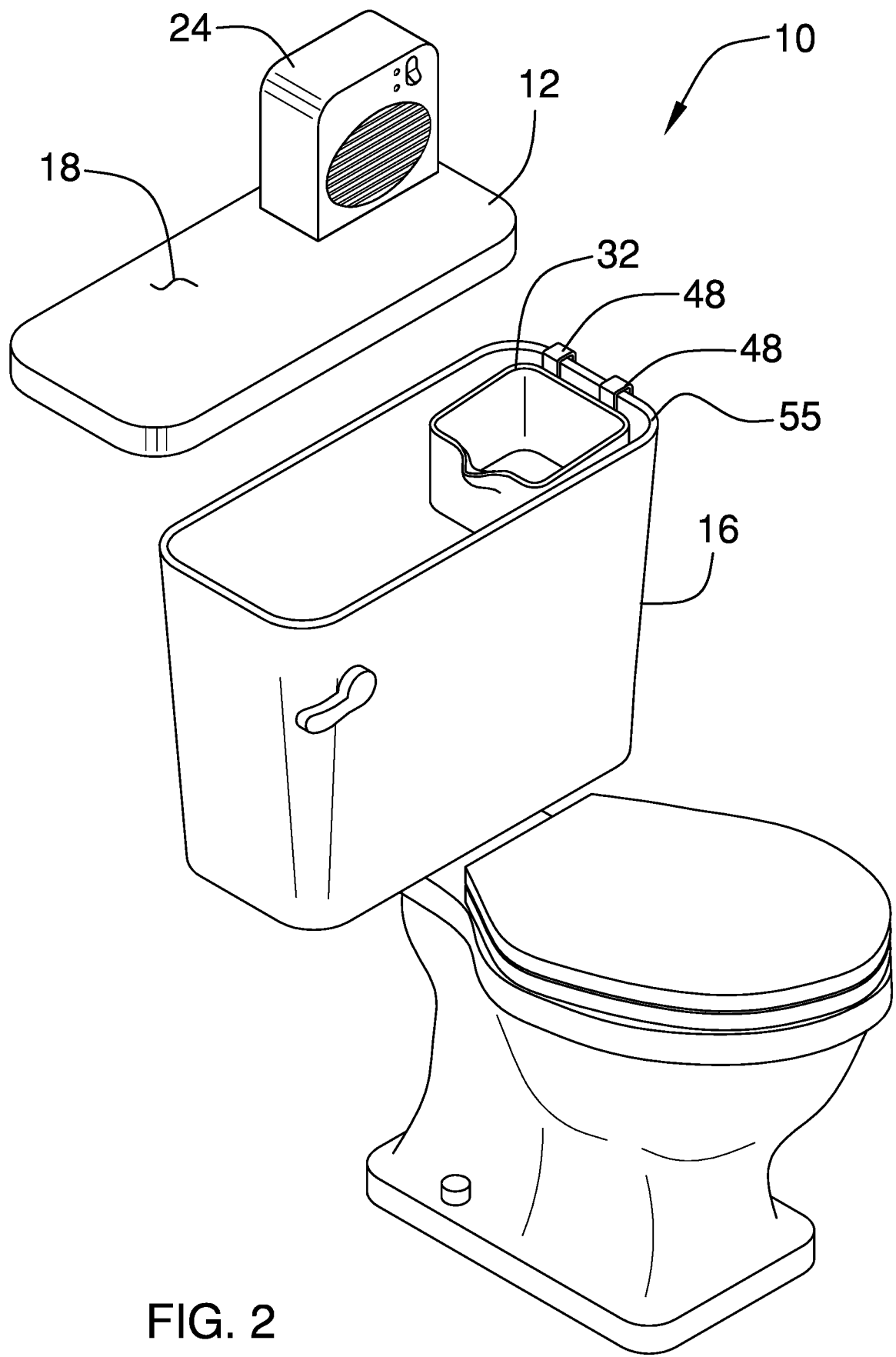
FIG. 2 is an exploded top perspective view of an embodiment of the disclosure.

With reference now to the drawings, and in particular to FIGS. 1 through 5 thereof, a new dehumidifier device embodying the principles and concepts of an embodiment of the disclosure and generally designated by the reference numeral 10 will be described.

As best illustrated in FIGS. 1 through 5, the toilet dehumidifier assembly 10 generally comprises a toilet tank lid 12 that has an opening 14 extending through the toilet tank lid 12, and the toilet tank lid 12 is positionable on toilet tank 16. The toilet tank 16 may be of a tank on a toilet of any conventional size or design, and the toilet tank lid 12 may be structured in a variety of shapes to correspond to the size and design of the toilet tank 16. The toilet tank lid 12 has a top surface 18 and a bottom surface 20, and the opening 14 extends through the top surface 18 and the bottom surface 20. The toilet tank 16 has a plurality of holes 22 each extending through the top surface 18 and the bottom surface 20, and the plurality of holes 22 is distributed around the opening 14.

A dehumidifier 24 is provided that is attachable to the toilet tank lid 12 to remove moisture from ambient air surrounding the toilet tank 16. The dehumidifier 24 is aligned with the opening 14 in the toilet tank lid 12 to facilitate the dehumidifier 24 to drain water 25 into the toilet tank 16. In this way the toilet can be flushed with reclaimed water 25 from the ambient air, thereby reducing the use of municipal water. The dehumidifier 24 has a bottom wall 26 and the dehumidifier 24 has an exhaust 28 that is integrated into the bottom wall 26 to drain the water 25 from the dehumidifier 24. The bottom wall 26 rests on the top surface 18 of the toilet tank lid 12 and the exhaust 28 is aligned with the opening 14 in the toilet tank lid 12. The dehumidifier 24 may be an electronic dehumidifier of any conventional design which has a sufficiently compact size for occupying less than 50.0 percent of the area of the top surface 18 of the toilet tank lid 12.

Figure 3:
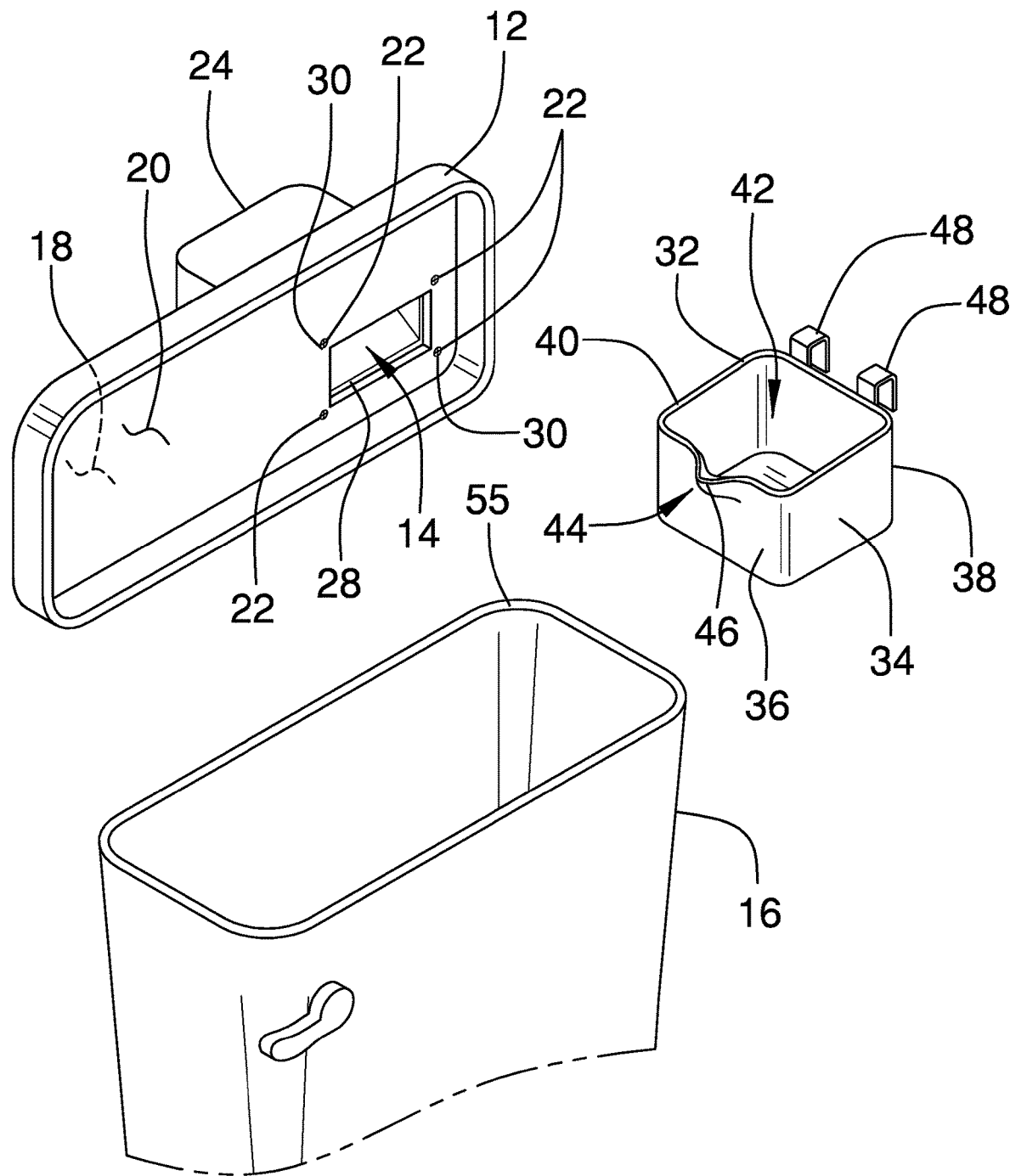
FIG. 3 is an exploded perspective view of an embodiment of the disclosure.
Figure 4:
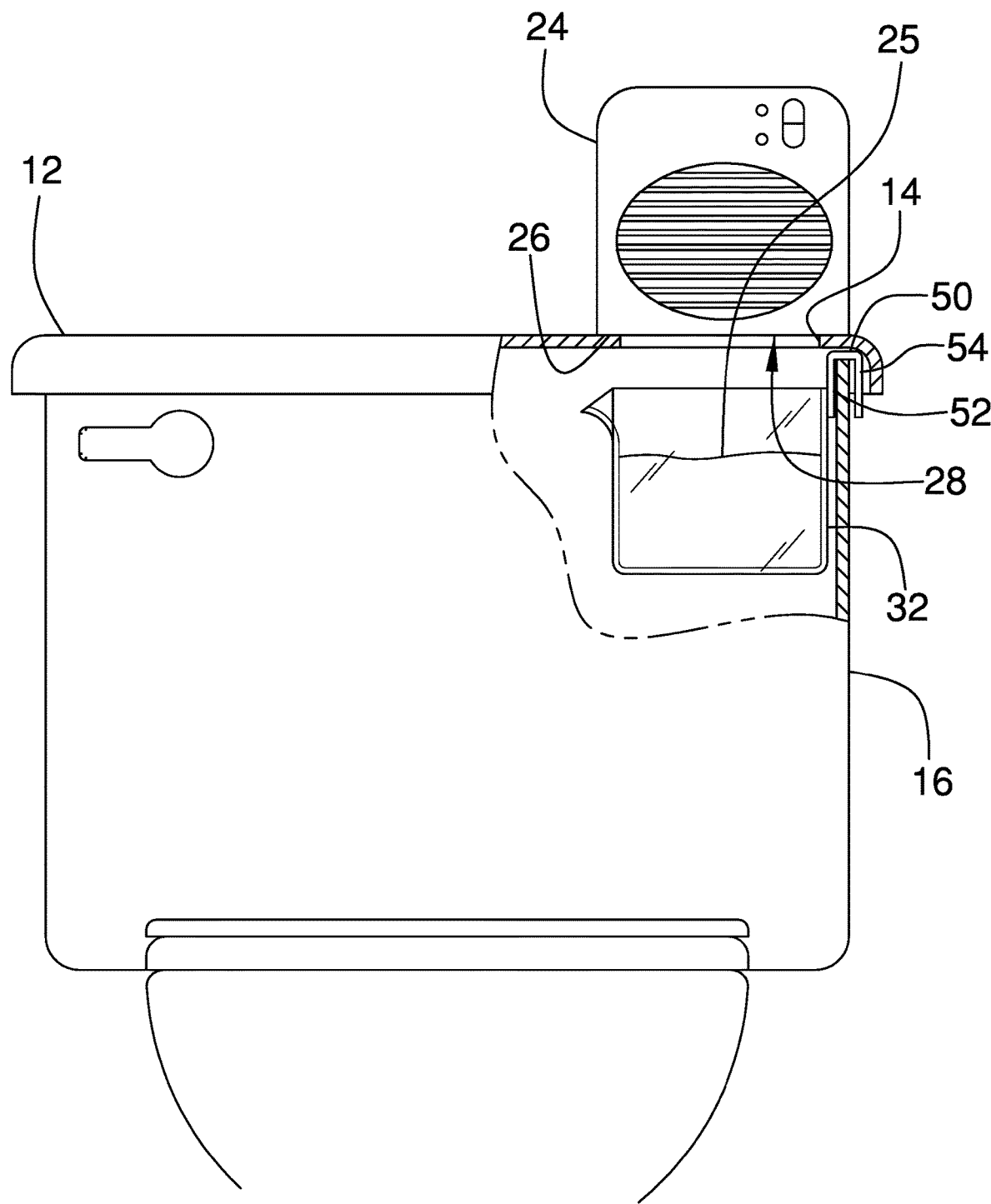
FIG. 4 is a front cut-away view of an embodiment of the disclosure.
Figure 5:
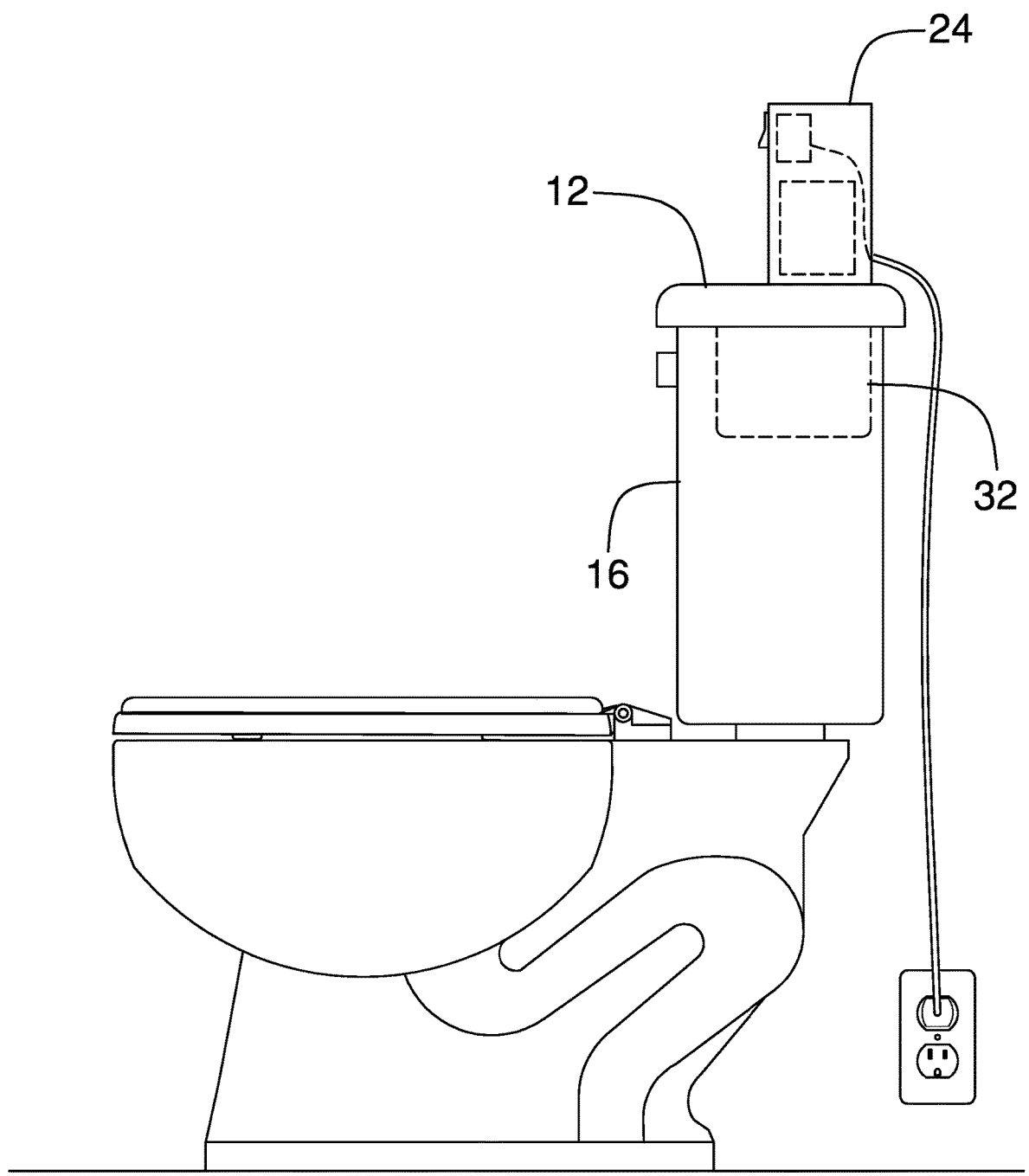
FIG. 5 is a left side phantom view of an embodiment of the disclosure.

As is most clearly shown in FIG. 3, a plurality of fasteners 30 is provided and each of the fasteners 30 is extendable through a respective one of the holes 22 in the toilet tank lid 12. Each of the fasteners 30 engages the bottom wall 26 of the dehumidifier 24 for retaining the dehumidifier 24 on the top surface 18 of the toilet tank lid 12. Each of the fasteners 30 may comprise a screw, a bolt or other type of threaded fastener that can releasably attach the dehumidifier 24 to the toilet tank lid 12.

A container 32 is provided which is positionable inside the toilet tank 16 to capture the water 25 being drained from the dehumidifier 24. In this way the container 32 can be employed to water 25 plants, for example, with the reclaimed water 25 rather than flushing the toilet with the reclaimed water 25. The container 32 has an outer wall 34, the outer wall 34 has a front side 36 and a back side 38, and the outer wall 34 has a top edge 40 defining an opening 42 into the container 32. The top edge 40 corresponding to the front side 36 has a curved section 44 which curves downwardly and away from the back side 38 to define a spout 46. The spout 46 facilitates overflowing water 25 to run into the toilet tank 16 when the container 32 becomes filled with water 25. Moreover, the spout 46 enhances pouring the water 25 from the container 32 for purposes other than flushing the toilet.

A pair of grapples 48 is provided and each of the grapples 48 is coupled to and extends away from the back side 38 of the outer wall 34 of the container 32. Each of the grapples 48 comprises a central portion 50 extending between a first outward portion 52 and a second outward portion 54. Each of the first outward portion 52 and the second outward portion 54 is oriented perpendicular to the central portion 50 such that each of the grapples 48 has a U-shape. The first outward portion 52 of each of the grapples 48 is coupled to the back side 38 of the outer wall 34 such that the second outward portion 54 of each of the grapples 48 is spaced from and extends downwardly along the back side 38 of the outer wall 34. In this way each of the grapples 48 can engage a top edge 55 of the toilet tank 16 having the central portion 50 of each of the grapples 48 resting on the top edge 40. The central portion 50 of each of the grapples 48 is spaced upwardly from the top edge 40 of the outer wall 34 of the container 32. Furthermore, the container 32 is positionable such that the container 32 is aligned with the opening 14 in the toilet tank lid 12 when the toilet tank lid 12 is positioned on the toilet tank 16.

In use, the toilet tank lid 12 is positioned on the toilet tank 16 and the dehumidifier 24 removes moisture from the ambient air. The dehumidifier 24 drains through the opening 14 in the toilet tank lid 12 and into the container 32. In this way the reclaimed water 25 is stored for a variety of future uses. The container 32 can be removed from the toilet tank 16 or the container 32 can be offset from the opening 14 in the toilet tank lid 12. In this way the reclaimed water 25 drains into the toilet tank 16 to be used for flushing the toilet.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A toilet dehumidifier assembly for mounting a dehumidifier to a toilet, said assembly comprising:
   a toilet tank lid having an opening extending through said toilet lid, said toilet tank lid being positionable on a toilet tank;
   a dehumidifier being attachable to said toilet tank lid wherein said dehumidifier is configured to remove moisture from ambient air surrounding the toilet tank, said dehumidifier being aligned with said opening in said toilet tank lid wherein said dehumidifier is configured to drain water into the toilet tank;
   a container being positionable inside the toilet tank wherein said container is configured to capture the water drained from said dehumidifier; and
   wherein said container has an outer wall, said outer wall having a front side and a bark side, said outer wall having a top edge defining an opening into said container, said top edge corresponding to said front side having a curved section which curves downwardly and away from said back side to define a spout wherein said spout is configured to facilitate overflowing water to run into the toilet tank.

2. The assembly according to claim 1, wherein:
   said toilet tank lid has a top surface and a bottom surface, said opening extending through said top surface and said bottom surface, said toilet tank having a plurality of holes each extending through said top surface and said bottom surface, said plurality of holes being distributed around said opening; and
   said dehumidifier has a bottom wall, said dehumidifier having an exhaust being integrated into said bottom wall wherein said exhaust is configured to drain the water from said dehumidifier, said bottom wall resting on said top surface of said toilet tank lid having said exhaust being aligned with said opening in said toilet tank lid.

3. The assembly according to claim 1, wherein:
   said assembly includes a pair of grapples, each of said grapples being coupled to and extending away from said back side of said outer wall of said container;
   each of said grapples comprises a central portion extending between a first outward portion and a second outward portion having each of said first outward portion and said second outward portion being oriented perpendicular to said central portion such that each of said grapples has a U-shape;
   said first outward portion of each of said grapples is coupled to said back side of said outer wall having said second outward portion of each of said grapples being spaced from and extending downwardly along said back side of said outer wall thereby facilitating each of said grapples to engage a top edge of the toilet tank having said central portion of each of said grapples resting on the top edge, said central portion of each of said grapples being spaced upwardly from said distal edge of said outer wall of said container; and said container is positionable such that said container is aligned with said opening in said toilet tank lid when said toilet tank lid is positioned on the toilet tank.

4. A toilet dehumidifier assembly for mounting a dehumidifier to a toilet, said assembly comprising:

a toilet tank lid having an opening extending through said toilet lid, said toilet tank lid being positionable on a toilet tank, said toilet tank lid having a top surface and a bottom surface, said opening extending through said top surface and said bottom surface, said toilet tank having a plurality of holes each extending through said top surface and said bottom surface, said plurality of holes being distributed around said opening;

a dehumidifier being attachable to said toilet tank lid wherein said dehumidifier is configured to remove moisture from ambient air surrounding the toilet tank, said dehumidifier being aligned with said opening in said toilet, tank lid wherein said dehumidifier is configured to drain water into the toilet tank, said dehumidifier having a bottom wall, said dehumidifier having an exhaust being integrated into said bottom wall wherein said exhaust is configured to drain the water from said dehumidifier, said bottom wall resting on said top surface of said toilet tank lid having said exhaust being aligned with said opening in said toilet tank lid;

a plurality of fasteners, each of said fasteners being extendable through a respective one of said holes in said toilet tank lid, each of said fasteners engaging said bottom wall of said dehumidifier for retaining said dehumidifier on said top surface of said toilet tank lid;

a container being positionable inside the toilet tank wherein said container is configured to capture the water drained from said dehumidifier, said container having an outer wall, said outer wall having a front side and a back side, said outer wall having a top edge defining an opening into said container, said top edge corresponding to said front side having a curved section which curves downwardly and away from said hack side to define a spout wherein said spout is configured to facilitate overflowing water to run into the toilet tank; and a pair of grapples, each of said grapples being coupled to and extending away from said back side of said outer wall of said container, each of said grapples comprising a central portion extending between a first outward portion and a second outward portion having each of said first outward portion and said second outward portion being oriented perpendicular to said central portion such that each of said grapples has a U-shape, said first outward portion of each of said grapples being coupled to said back side of said outer wall having said second outward portion of each of said grapples being spaced from and extending downwardly along said back side of said outer wall thereby facilitating each of said grapples to engage a top edge of the toilet tank having said central portion of each of said grapples resting on the top edge, said central portion of each of said grapples being spaced upwardly from said distal edge of said outer wall of said container, said container being positionable such that said container is aligned with said opening in said toilet tank lid when said toilet tank lid is positioned on the toilet tank.

5. A toilet dehumidifier system for mounting a dehumidifier to a toilet, said system comprising:

a toilet tank being mounted to a toilet, said toilet tank having a top edge;

a toilet tank lid having an opening extending through said toilet lid, said toilet tank lid being positionable on said toilet tank, said toilet tank lid having a top surface and a bottom surface, said opening extending through said top surface and said bottom surface, said toilet tank having a plurality of holes each extending through said top surface and said bottom surface, said plurality of holes being distributed around said opening;

a dehumidifier being attachable to said toilet tank lid wherein said dehumidifier is configured to remove moisture from ambient air surrounding said toilet tank, said dehumidifier being aligned with said opening in said toilet tank lid wherein said dehumidifier is configured to drain water into said toilet tank, said dehumidifier having a bottom wall, said dehumidifier having an exhaust being integrated into said bottom wall wherein said exhaust is configured to drain the water from said dehumidifier, said bottom wall resting on said top surface of said toilet tank lid having said exhaust being aligned with said opening in said toilet tank lid;

a plurality of fasteners, each of said fasteners being extendable through a respective one of said holes in said toilet tank lid, each of said fasteners engaging said bottom wall of said dehumidifier for retaining said dehumidifier on said top surface of said toilet tank lid;

a container being positionable inside said toilet tank wherein said container is configured to capture the water drained from said dehumidifier, said container having an outer wall, said outer wall having a front side and a hack side, said outer wall having a top edge defining an opening into said container, said top edge corresponding to said front side having a curved section which curves downwardly and away from said back side to define a spout wherein said spout is configured to facilitate overflowing water to run into said toilet tank; and a pair of grapples, each of said grapples being coupled to and extending away, from said back side of said outer wall of said container, each of said grapples comprising a central portion extending between a first outward portion and a second outward portion having each of said first outward portion and said second outward portion being oriented perpendicular to said central portion such that each of said grapples has a U-shape, said first outward portion of each of said grapples being coupled to said back side of said outer wall having said second outward portion of each of said grapples being spaced from and extending downwardly along said back side of said outer wall thereby facilitating each of said grapples to engage a top edge of said toilet tank having said central portion of each of said grapples resting on the top edge, said central portion of each of said grapples being spaced upwardly from said distal edge of said outer wall of said container, said container being positionable such that said container is aligned with said opening in said toilet tank lid when said toilet tank lid is positioned on said toilet tank.

* * * * *